(12) United States Patent
Schnitzer

(10) Patent No.: US 8,549,953 B2
(45) Date of Patent: Oct. 8, 2013

(54) STEERING COLUMN COMPRISING A PLASTIC SLIDING SLEEVE

(75) Inventor: Rony Schnitzer, Furstentum (LI)

(73) Assignee: ThyssenKrupp Presta AG, Eschen (LI)

( * ) Notice: Subject to any disclaimer, the term of this patent is extended or adjusted under 35 U.S.C. 154(b) by 448 days.

(21) Appl. No.: 12/812,846

(22) PCT Filed: Jan. 9, 2009

(86) PCT No.: PCT/EP2009/000089
§ 371 (c)(1),
(2), (4) Date: Aug. 20, 2010

(87) PCT Pub. No.: WO2009/090018
PCT Pub. Date: Jul. 23, 2009

(65) Prior Publication Data
US 2010/0307280 A1 Dec. 9, 2010

(30) Foreign Application Priority Data
Jan. 18, 2008 (DE) .......................... 10 2008 005 256

(51) Int. Cl.
*B62D 1/185* (2006.01)

(52) U.S. Cl.
USPC ............... 74/493; 74/495; 280/775; 280/777; 280/779

(58) Field of Classification Search
USPC ............. 74/442, 493, 495; 280/775, 777, 779
See application file for complete search history.

(56) References Cited

U.S. PATENT DOCUMENTS

| | | | | |
|---|---|---|---|---|
| 3,482,653 A | | 12/1969 | Shin Maki et al. | |
| 3,877,319 A | | 4/1975 | Cooper | |
| 5,086,661 A | * | 2/1992 | Hancock | 74/493 |
| 5,314,204 A | * | 5/1994 | DuRocher et al. | 280/777 |
| 5,348,345 A | * | 9/1994 | Dykema et al. | 280/777 |
| 5,417,614 A | * | 5/1995 | Dykema et al. | 464/162 |
| 5,476,284 A | * | 12/1995 | DuRocher et al. | 280/777 |
| 5,606,790 A | * | 3/1997 | Laue | 29/517 |

(Continued)

FOREIGN PATENT DOCUMENTS

FR 1530799 A 6/1968

OTHER PUBLICATIONS

English language translation of the International Preliminary Report on Patentability issued in related International Application No. PCT/EP2009/000089.

*Primary Examiner* — Troy Chambers
*Assistant Examiner* — Valentin Craciun
(74) *Attorney, Agent, or Firm* — Novak Druce Connolly Bove + Quigg LLP

(57) ABSTRACT

The invention relates to a steering column for a motor vehicle, comprising a bracket (1) which carries an upper jacket unit (3) and a lower jacket unit (5), wherein the jacket units (3, 5) surround a steering shaft (8) rotatably mounted therein, and wherein the jacket units (3, 5) comprise an inner jacket tube (10) and an outer jacket tube (11) which surrounds the inner jacket tube (10) at least in some sections, said jacket tubes being mounted such that they can be displaced one inside the other in their axial direction by means of a plastic sleeve (6) made of thermoplastic which is located therebetween. Freedom from play is achieved in that the plastic sleeve (6) is inserted into the outer jacket tube (11) with a press fit, and in that the outer jacket tube (11) has at least one opening (12), in the region of which the plastic sleeve (6) is pressed against the inner jacket tube (10) by deformation.

6 Claims, 4 Drawing Sheets

(56) References Cited

U.S. PATENT DOCUMENTS

| | | | |
|---|---|---|---|
| 5,640,884 A * | 6/1997 | Fujiu et al. | 74/492 |
| 5,758,545 A * | 6/1998 | Fevre et al. | 74/493 |
| 6,109,652 A * | 8/2000 | Kim et al. | 280/777 |
| 6,339,970 B1 * | 1/2002 | Blex | 74/492 |
| 6,389,923 B1 * | 5/2002 | Barton et al. | 74/492 |
| 7,784,830 B2 * | 8/2010 | Ulintz | 280/775 |
| 8,096,036 B2 * | 1/2012 | Dubay et al. | 29/434 |
| 2005/0087970 A1 * | 4/2005 | Ulintz | 280/775 |
| 2005/0200111 A1 | 9/2005 | Cymbal et al. | |
| 2005/0262960 A1 * | 12/2005 | Cymbal et al. | 74/492 |
| 2006/0001249 A1 * | 1/2006 | Fargeas et al. | 280/777 |
| 2006/0243089 A1 * | 11/2006 | Cymbal et al. | 74/493 |
| 2007/0113701 A1 * | 5/2007 | Streng et al. | 74/492 |
| 2007/0137378 A1 * | 6/2007 | Bastein et al. | 74/493 |
| 2009/0056493 A1 * | 3/2009 | Dubay et al. | 74/492 |
| 2009/0165280 A1 * | 7/2009 | Cymbal et al. | 29/428 |

* cited by examiner

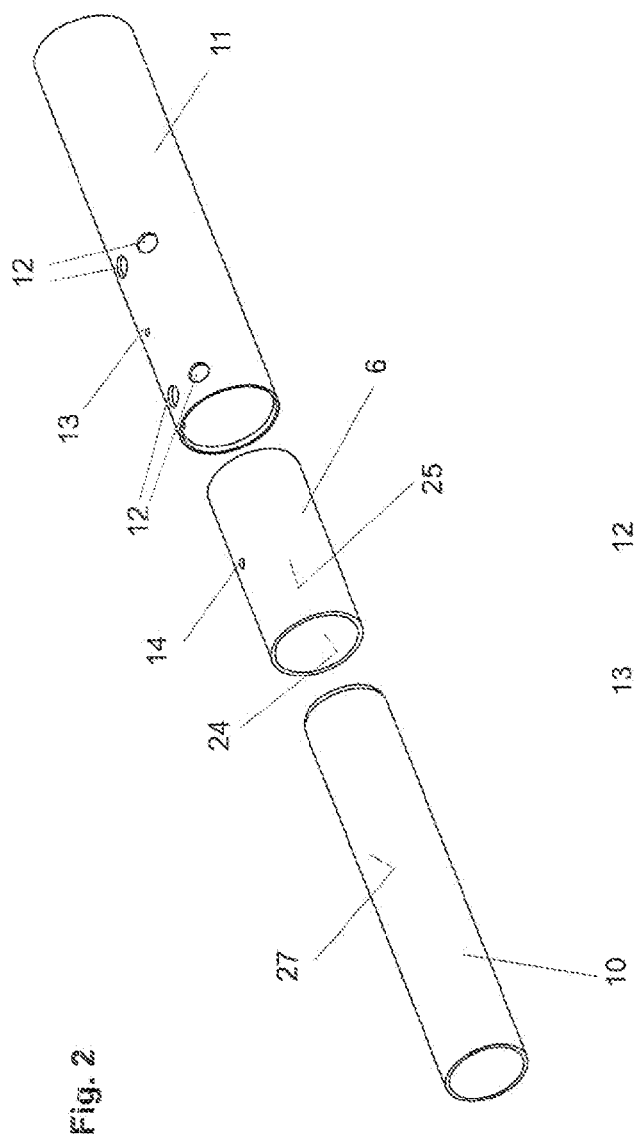
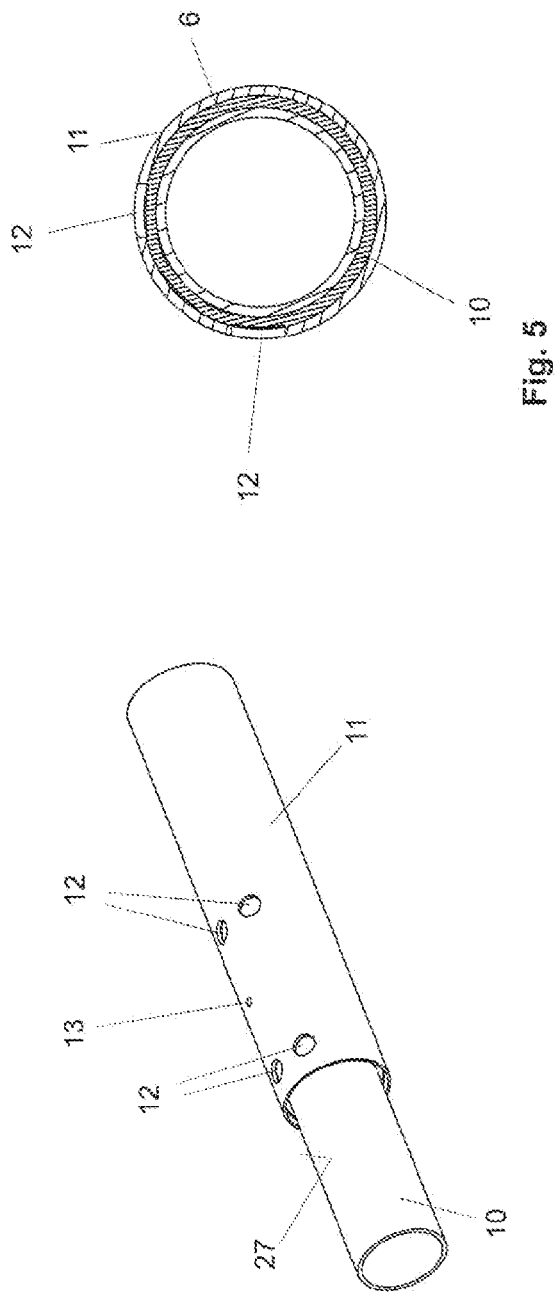

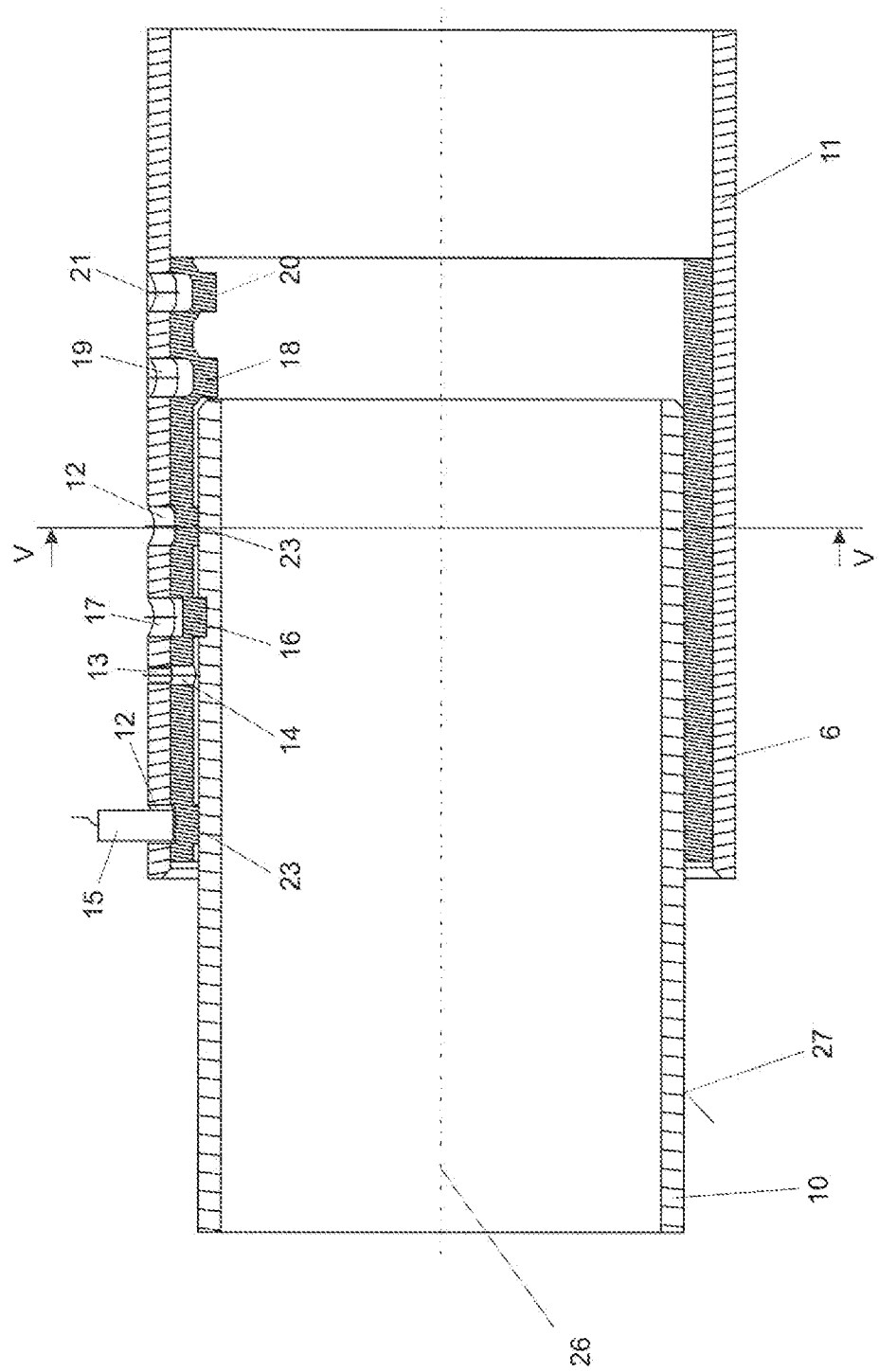

STEERING COLUMN COMPRISING A PLASTIC SLIDING SLEEVE

CROSS-REFERENCE TO RELATED APPLICATIONS

This application is a 35 U.S.C. §371 National Stage Application of International Application No. PCT/EP2009/000089, filed Jan. 9, 2009, which claims the benefit of German Patent Application No. 102008005256.6, filed Jan. 18, 2008, the entire contents of which are incorporated herein by reference in their entireties.

The present invention relates to a steering column arrangement and to a production method.

Steering columns in motor vehicles are generally adjustable so as to be able to adapt the position of the steering wheel to the requirements of different drivers. For the axial adjustability of the steering column, often in the prior art there is provided an arrangement composed of two concentric tubes which are movable telescopically one inside the other. Provided between the two tubes is a bearing which ensures the axial displaceability and optionally also permits a relative rotation.

Steering columns which are not axially adjustable also have a similar structure, in which two coaxial jacket parts are mounted such that they can be displaced one inside the other in order to allow a compression of the steering column in the event of an impact.

It is known in the prior art to use plastic elements here. Plastic elements combine self-lubricating properties with vibration-damping properties and are therefore particularly suitable for this bearing.

The documents U.S. Pat. No. 5,902,186 and EP 1538365A1 disclose steering columns in which plastic bushings are used in order to be able to absorb vibrations and impact energy. However, these plastic bushings do not perform any guide function.

The document U.S. Pat. No. 5,417,614 discloses a length-adjustable steering column, in which an outer jacket tube serves as a rotary bearing for a shaft part. The shaft part mounted therein is provided with a plastic bushing injection-moulded onto the outside thereof, which in turn slides in the jacket tube. The plastic bushing does not provide any sliding guidance.

The closest prior art is published in EP 1717127A1 and discloses a telescopic guide for a steering column comprising a plastic bushing which is inserted between a shaft and a surrounding jacket tube. This bushing is attached to the inner shaft by integrally formed plastic elements and slides in the surrounding jacket tube in the axial direction and in the circumferential direction. Finally, the document EP 1754646A2 discloses a bearing sleeve for a telescopic steering column. This sleeve is of complex design and is provided with special support elements which are intended to ensure a low-play support of the two tube parts which are rotatable and displaceable one inside the other. This bearing is particularly complicated.

The object of the present invention is therefore to provide a telescopic bearing of two tubes which are axially displaceable relative to one another by means of a plastic bushing, said bearing being easy to produce and to assemble and nevertheless being able to be implemented with particularly little play.

This object is achieved by a steering column and by a production method as described and/or claimed hereinbelow.

The object is achieved by a steering column for a motor vehicle, comprising a bracket which carries an upper jacket unit and a lower jacket unit, wherein the jacket units surround a steering shaft rotatably mounted therein, and wherein the jacket units comprise an inner jacket tube with an outer surface and an outer jacket tube which surrounds the inner jacket tube at least in some sections, said jacket tubes being mounted such that they can be displaced one inside the other in their axial direction by means of a plastic sleeve made of thermoplastic which is located therebetween and which has an inner surface directed towards the inner jacket tube and an outer surface directed towards the outer jacket tube, in which according to the invention the plastic sleeve is inserted into the outer jacket tube with a press fit, and in which the outer jacket tube has at least one opening, in the region of which the plastic sleeve has, on its inner surface, protrusions towards the inner jacket tube or towards a central axis, at which the plastic sleeve is pressed against the outer surface of the inner jacket tube.

The plastic sleeve accordingly acts as a sliding sleeve.

The bearing of the protrusions is brought about either by a plastic or by an elastic or by a combination of plastic and elastic deformation. In the preferred case, the elastic deformation is brought about by a spring element which acts with a spring effect on the protrusions in the direction of the surface of the inner jacket tube.

The object is also achieved by a method for producing a telescopic steering column for a motor vehicle, comprising a bracket which carries an upper jacket unit and a lower jacket unit, wherein the jacket units surround a steering shaft rotatably mounted therein, and wherein the jacket units comprise an inner jacket tube with an outer surface and an outer jacket tube which surrounds the inner jacket tube at least in some sections, said jacket tubes being mounted such that they can be displaced one inside the other in their axial direction by means of a plastic sleeve made of thermoplastic which is located therebetween, wherein according to the invention the plastic sleeve is inserted into the outer jacket tube with a press fit, the inner jacket tube is introduced into the plastic sleeve with a sliding fit, and in that, in the region of at least one opening of the outer jacket tube, the plastic sleeve is pressed against the inner jacket tube by plastic deformation.

In the preferred case, the plastic deformation is achieved by a deformation, in the simplest case a pressing, under the effect of heat. In a further preferred case, the heating takes place by means of ultrasound which is brought about by means of a sonotrode which is simultaneously used as a pressing ram.

Small gaps which occur in the course of subsequent cooling and/or springback of the material of the plastic sleeve are to be regarded as so small that a low-play guidance of the two jacket tubes is ensured. Account must be taken here of the fact that a bearing play is always provided for the purpose of easy displacement. This can also be set by the shrinkage process.

In addition to or instead of the plastic deformation, an elastic deformation may be brought about by a pretensioned spring element.

Since the plastic sleeve is inserted into the outer jacket tube with a press fit and the outer jacket tube has at least one opening, in the region of which the plastic sleeve is pressed against the inner jacket tube by deformation, an almost play-free connection is ensured which does not impair the telescopic mobility. A secure and solid feel is thus imparted to the driver during operation of the steering column.

Apart from the telescopic mobility, it is also possible if desired to achieve a rotatability if the jacket tubes and also the plastic sleeve have circular cross-sections.

If the openings are provided in at least two axially spaced-apart positions relative to the axial direction of the jacket tubes, it is also possible to absorb lever forces which act on the steering column, so that a tilting of the jacket tubes inside one another, for example in the event of an impact, is prevented.

Point-type bearing surfaces with a small contact area can be achieved for example if the sonotrodes have a round outer diameter and thus leave behind a quasi-circular impression on the outer wall of the plastic sleeve after use. The openings in the outer jacket tube may moreover be configured simply as round bores or punched-out holes.

One important advantage of the invention is the possibility of using inexpensive and simply shaped sonotrodes for production. The sonotrode need only in each case be able to be passed through the openings.

If the openings are configured as slots which run at least partially in the circumferential direction of the outer jacket tube, linear or rectangular bearing points can be achieved.

Since in a method for producing a telescopic steering column for a motor vehicle it is provided that the plastic sleeve is inserted into the outer jacket tube with a press fit, the inner jacket tube is introduced into the plastic sleeve with a sliding fit, and that, in the region of at least one opening of the outer jacket tube, the plastic sleeve is pressed against the inner jacket tube by plastic deformation, only a few components are required, which moreover are of particularly simple design. Freedom from play is achieved in particular due to the fact that the plastic deformation of the plastic sleeve takes place under the effect of heat. In this case, it may be advantageous if the plastic deformation takes place under the effect of ultrasound and radial pressure.

A good guidance in the longitudinal direction is achieved if the deformation takes place at least at two locations which are spaced apart from one another in the axial direction of the plastic sleeve.

Reliable functioning in the event of an impact, but also during use as an axially adjustable steering column, is achieved if the inner jacket tube has such a smooth outer surface that, even after the bearing of the plastic sleeve due to the local deformation, a displaceability of the inner jacket tube in the plastic sleeve is possible.

In one further development of the invention, in a manner corresponding to a cut-out on the outer jacket tube, a cut-out may also be provided on the inner jacket tube, into which material of the plastic sleeve is pushed from outside, likewise by means of a sonotrode. In this way, a breakaway element can be formed which, when a certain force in the direction of displacement of the two jacket tubes is exceeded, enables the displacement. Alternatively, the breakaway element may also be arranged directly at the end of or even at a certain distance from the end of the inner jacket tube, as a result of which there is no need for a special cut-out on the inner jacket tube.

One particular advantage of the solution according to the invention lies in the fact that the protrusions which are arranged on the plastic sleeve in order to form the contact areas between the plastic sleeve and the inner jacket tube and/or in order to form the breakaway elements are formed integrally with the plastic sleeve and not as separate parts which subsequently have to be joined.

The solution according to the invention can be used in steering columns which are height-adjustable and/or length-adjustable or not adjustable at all. In the case of a steering column which is not adjustable or is only height-adjustable, the plastic sleeve serves as a guide element in the event of a crash. In the case of a length-adjustable steering column, the plastic sleeve may also serve for guidance during the adjustment. In this case, there may likewise be provided a breakaway element which limits the displacement travel during an adjustment by the driver.

The present invention will be described below in exemplary embodiments with reference to drawings. In the drawings:

FIG. 2 shows a schematic view of the bearing components of the steering column;

FIG. 3 shows the bearing components of FIG. 2 in the operating position;

FIG. 4 shows a further exemplary embodiment, shown in longitudinal section along the central axis of the arrangement according to FIG. 3;

FIG. 5 shows a cross-section through the arrangement according to FIG. 4 along the line V-V.

Figure 1:
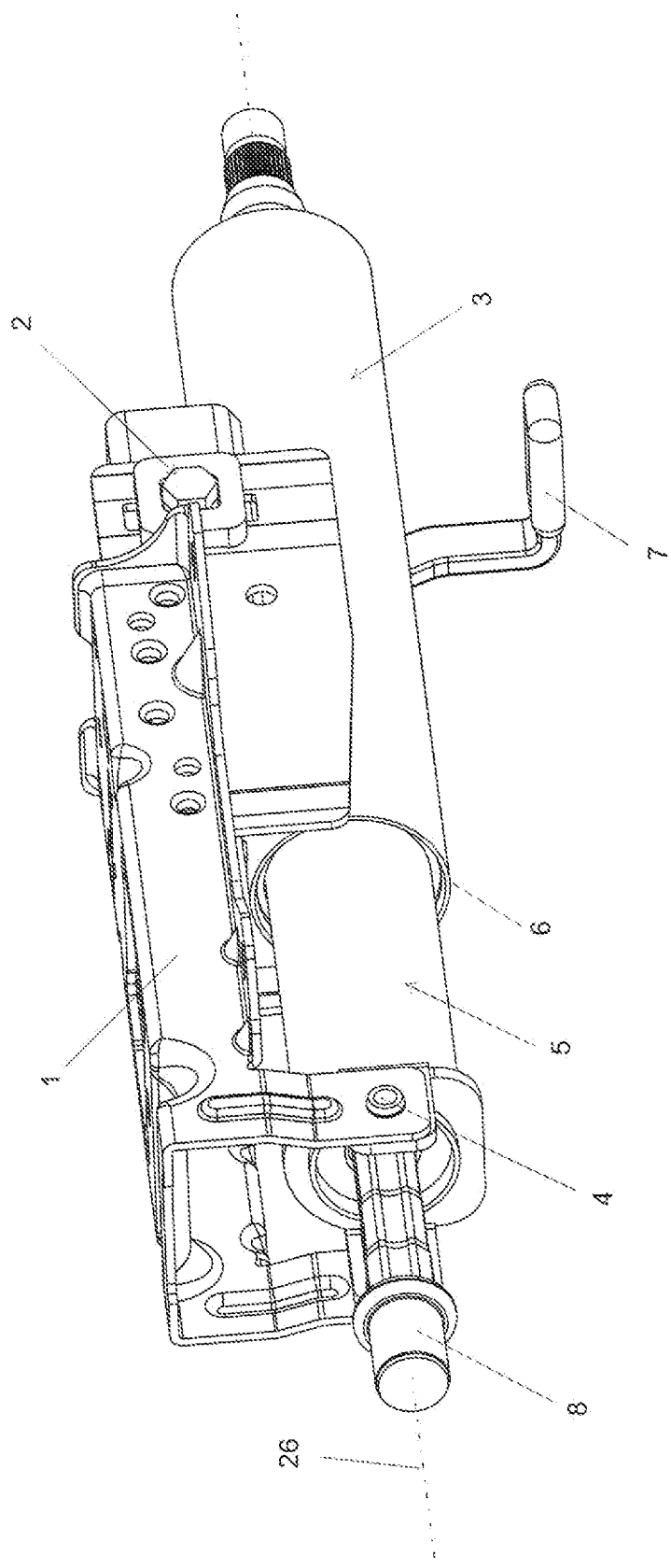
FIG. 1 shows a perspective view of a steering column with a bearing configured according to the invention.

FIG. 1 shows a perspective view of a steering column for a motor vehicle, comprising a bracket 1 for attachment to the body. The bracket 1 carries a clamping system 2 for holding an upper jacket unit 3 and a pivot bearing 4, in which a lower jacket unit 5 is mounted. The upper jacket unit 3 and the lower jacket unit 5 are arranged concentric to one another with the common central axis 26, which coincides with the axis of the steering spindle 8. They are essentially tubular. A plastic sleeve 6 is inserted between the upper jacket unit 3 and the lower jacket unit 5. The plastic sleeve 6 (cf. FIG. 2) has an outer surface 25 and an inner surface 24, which are oriented approximately parallel to one another. An adjusting lever 7 serves for actuating the clamping system 2.

A steering shaft 8 is rotatably mounted inside the jacket units 3 and 5.

The invention is not limited to the embodiment in which the upper and lower jacket unit are arranged concentric to one another. It is conceivable and possible to arrange the jacket units eccentric to one another.

FIG. 2 shows the components, arranged coaxial with one another, of the upper jacket unit 3 and of the lower jacket unit 5 and also the plastic sleeve 6 in a schematic view prior to assembly. The lower jacket unit 1 comprises an inner jacket tube 10 with an outer surface 27. The upper jacket unit 3 comprises an outer jacket tube 11. The plastic sleeve 6 is provided between the inner jacket tube 10 and the outer jacket tube 11. In the illustrated exemplary embodiment, a total of 4 openings 12 are formed on the outer jacket tube 11 on the outer circumferential surface thereof, said openings preferably being circular. A further bore 13 is preferably arranged between the openings 12. In a corresponding manner, the plastic sleeve 6 has a bore 14 which is arranged centrally on the outer circumference.

FIG. 3 shows the components of FIG. 2 in the assembled state. For the purposes of assembly, the plastic sleeve 6 is pressed into the outer jacket tube 11 with a press fit, advantageously until the bore 13 of the outer jacket tube 11 has been brought into alignment with the bore 14 of the plastic sleeve 6. The inner jacket tube 11 is then pushed with a sliding fit into the plastic sleeve 6, which is firmly seated in the outer jacket tube 11 with a press fit. The inner jacket tube 10 is axially displaceable with little force in the plastic sleeve 6.

The inner jacket tube 10 and the outer jacket tube 11 are preferably arranged concentrically to one another with the central axis 26. However, it is conceivable and possible to arrange the two jacket tubes 10, 11 eccentrically to one another. In this case, the outer surface 25 of the plastic sleeve 6 is arranged eccentrically to the inner surface 24 of the plastic sleeve 6. In this case, the small eccentric offset between the inner jacket tube 10 and the outer jacket tube 11, which is brought about by the shaping of the protrusions 23, is ignored.

It is also possible to omit the bore 14. In this case, other means may be provided for the purpose of positioning during assembly, for example stops in the assembly tools, or the plastic sleeve 6 is simply pressed into the outer jacket tube 11 until a stop is reached.

A further production step is likewise shown schematically in FIG. 4. A sonotrode 15 is introduced into an opening 12 and is brought into mechanical contact with the plastic sleeve 6 in the region of the opening 12. When the sonotrode 15 is activated, the plastic sleeve 6 is locally heated and thus softened due to the mechanical power of the applied ultrasound. The plastic sleeve 6 therefore becomes deformable and is pressed onto the inner jacket tube 10 under the mechanical pressure of the sonotrode 15. A local contact point between the plastic sleeve 6 and the inner jacket tube 10 is obtained in the form of an impression. This impression in the plastic sleeve 6 reduces the play of the inner jacket tube 10 in the plastic sleeve 6 to a small value, preferably to zero. The same process is carried out in the other openings 12, so that a plurality of bearing points which are as free from play as possible are obtained over the circumferential surface of the inner jacket tube 10.

Compared to the exemplary embodiment shown in FIGS. 2 and 3, the exemplary embodiment shown in FIG. 4 has been altered in that breakaway elements 16, 18, 20 are additionally provided. Like the bearing points, the breakaway elements are formed directly from the plastic sleeve 6 by means of a sonotrode which is passed through the cut-outs 17, 19, 21 and heats the plastic under the effect of ultrasound and brings about a protrusion by means of pressing, so that the breakaway elements 16, 18, 20 protrude into the movement path of the inner jacket tube 10. According to the example, a breakaway element 16 is formed in a cut-out 22 in the inner jacket tube 10. Although three breakaway elements are shown in the exemplary embodiment, the number can be freely chosen. In particular, a single breakaway element may suffice. The length of the plastic sleeve will be adapted to the requirements.

The protrusions of the breakaway elements 16, 18, 20 protrude beyond the outer surface 27 of the inner jacket tube 10, preferably in a range from 0.5 mm to 4 mm, particularly preferably in the range from 1 mm to 2.5 mm. In this way, a displacement of the two jacket tubes 10, 11 is prevented, at least up to a predefinable force. At the same time, when a predefinable force is exceeded, the breakaway element can be sheared off or pushed back so that the displacement of the two jacket tubes 10, 11 relative to one another is possible. The force here is to be understood to mean the force in the direction of the central axis 26 on the jacket tubes 10, 11 for generating a displacement, as occurs in particular in the event of a crash.

In the case of an adjustable steering column, the breakaway element 20 is arranged in such a way that, after reaching a certain displacement travel, further displacement is prevented if the force does not reach a corresponding threshold. In the example, the breakaway element 20 is at a corresponding distance from the inner jacket tube 10 when the jacket units 3, 5 are extended to the greatest length. Alternatively, the cut-out 22 may be configured as an elongate hole.

FIG. 5 shows the state produced in the last-described method step in a cross-section showing the three components assembled concentrically one inside the other.

Figure 6:
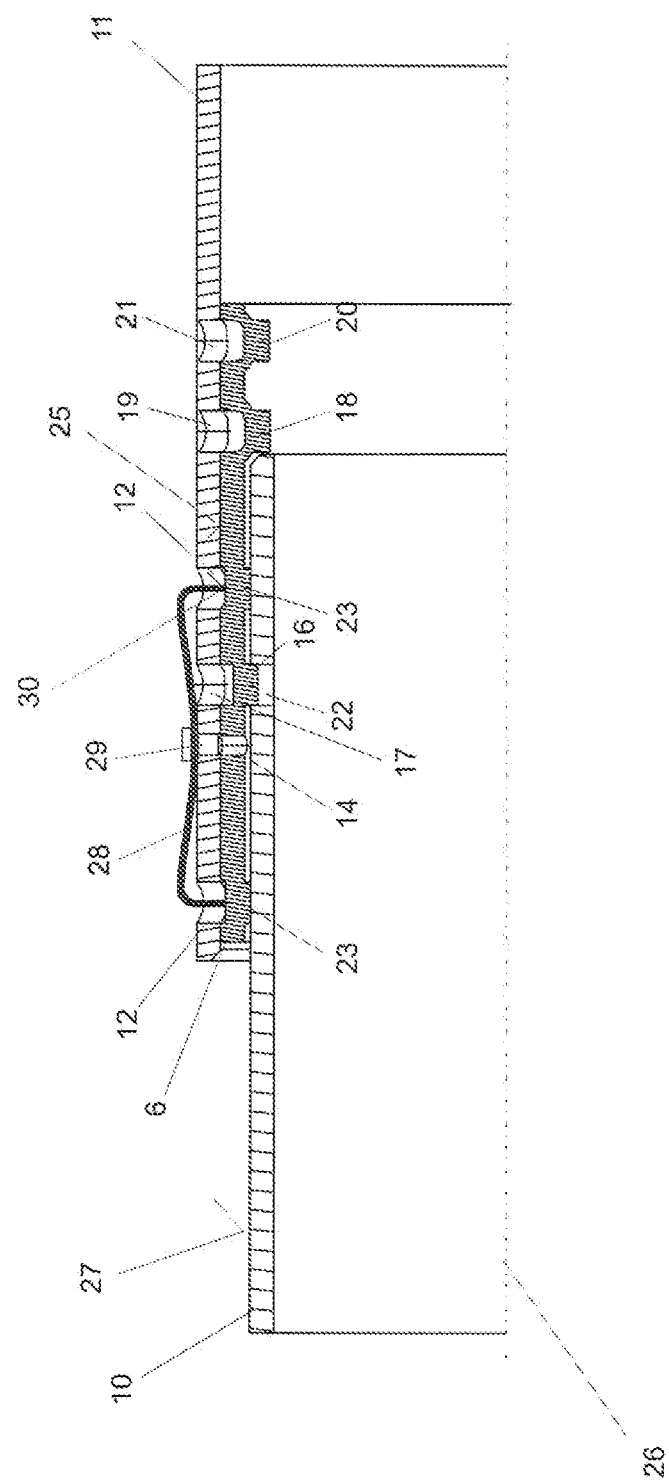
FIG. 6 shows part of an alternative embodiment, in a view analogous to FIG. 5.

A further embodiment is illustrated schematically in FIG. 6. According to this embodiment, the plastic sleeve 6 is acted upon locally from its outer surface 25 by a spring force. To this end, a spring 28 is provided which accordingly passes through openings 12 in the outer jacket tube 11 and is held under pretension against the outer jacket tube 11 by a fixing element 29. As a result, the plastic sleeve 6 in predefined surface areas 30, corresponding to the protrusions 23, is pressed against the outer surface 27 of the inner jacket tube 10 or is elastically deformed and correspondingly pressed. Advantageously, but not necessarily, as in connection with the other embodiments of the invention already described, corresponding protrusions 23 have been formed beforehand in the plastic sleeve 6 by means of plastic deformation. By using the additional spring force, the residual play already described above, as occurs due to shrinkage processes or springback between the plastic sleeve 6 and the outer surface 27 of the inner jacket tube, can be eliminated if necessary. When using this embodiment, account must be taken of the fact that the displacement force for displacing the two jacket tubes 10, 11 is increased on account of the spring force.

As a result, the described arrangement and the described production method result in a coaxial arrangement of a lower jacket part in an upper jacket part with a plastic sleeve located therebetween. The arrangement is almost or entirely free from play, so that in particular also no rattling can occur during operation in practice. If the telescopic mobility of the jacket unit is provided as a safety element for an impact, in this case too a reliable guidance is ensured by the described play-free assembly, in particular a tilting of the coaxial components is ruled out. The desired function, according to which the jacket unit can be pushed together under the effect of axial forces in the event of an impact, is ensured.

In a manner differing from the described embodiment, alternative exemplary embodiments of the invention may also have non-round jacket tubes and a correspondingly non-round plastic sleeve. For instance, the invention is also applicable for example in the case of jacket tubes 10, 11 in which the surfaces have one or more corresponding small flattened portions in order to form an anti-rotation means. However, other polygonal or elliptical or other non-round shapes are also conceivable and possible.

The shape and the arrangement of the openings in the outer jacket tube may differ. For example, openings may also be provided which run in the manner of a slot in the circumferential direction of the outer jacket tube and cover a circumferential angle of 45° to 180°.

The plastic sleeve is made from a thermoplastic material, so that not only is the currently preferred plasticising of the material using an ultrasound probe possible, but rather also a local heating which is brought about in some other way may be used, for example by means of hot stamping or IR laser radiation. When slot-like openings are formed, a linear bearing area of the inner jacket tube 10 against the plastic sleeve 6 is then also achievable. A deformation of the plastic sleeve 6 without mechanical pressure can also be achieved by using a plastic sleeve 6 which contracts when heated. In this case, the plastic sleeve 6 is heated in the region of the openings of the outer jacket tube and then contracts inwards in the direction of the inner jacket tube 10 simply on account of its material properties such as the surface tension, and thus also ends up bearing in a secure, firm and play-free manner after the material has cooled.

REFERENCE NUMERALS 1. bracket
2. clamping system
3. upper jacket unit
4. pivot bearing 5. lower jacket unit
6. plastic sleeve
7. adjusting lever
8. steering shaft
10. inner jacket tube
11. outer jacket tube
12. openings
13. bore
14. bore
15. sonotrode
16. breakaway element
17. cut-out
18. breakaway element
19. cut-out
20. breakaway element
21. cut-out
22. cut-out
23. protrusions
24. inner surface of the plastic sleeve
25. outer surface of the plastic sleeve
26. central axis
27. outer surface of the inner jacket tube
28. spring element
29. fixing element
30. surface area

The invention claimed is:

1. A steering column for a motor vehicle, comprising a bracket which carries a upper jacket unit and a lower jacket unit, wherein the jacket units surround a steering shaft rotatably mounted therein, and wherein the jacket units comprise an inner jacket tube with an outer surface and an outer jacket tube which surrounds the inner jacket tube at least in some sections, said jacket tubes being mounted such that they can be displaced one inside the other in their axial direction by means of a plastic sleeve made of thermoplastic which is located therebetween and which has an inner surface directed towards the inner jacket tube and an outer surface directed towards the outer jacket tube, wherein the plastic sleeve is inserted into the outer jacket tube with a press fit, and wherein the outer jacket tube has at least one opening, in the region of which the plastic sleeve has, on its inner surface, protrusions towards the inner jacket tube, at which the plastic sleeve is pressed against the outer surface of the inner jacket tube, wherein a spring element is provided which passes through at least one opening and is held under pretension against a surface area of the outer surface of the plastic tube in the direction of the inner jacket tube.

2. The steering column according to claim 1, wherein at least one cut-out is formed in the outer jacket tube, in the region of which cut-out the plastic sleeve has on its inner surface a further protrusion, the distance of which from a central axis of the jacket tubes is smaller than the distance of the outer surface of the inner jacket tube in the region of the protrusion.

3. The steering column according to claim 2, wherein the further protrusion is designed as a breakaway element, wherein, when a certain force acting on the jacket tubes in the direction of displacement of these jacket tubes is exceeded, the further protrusion is designed to break away and enable the displacement.

4. The steering column according to claim 1, wherein the jacket tubes and also the plastic sleeve have circular cross-sections.

5. The steering column according to claim 1, wherein the openings are provided in at least two axially spaced-apart positions relative to the axial direction of the jacket tubes.

6. The steering column according to claim 1, wherein the openings are configured as round bores or punched-out holes.

* * * * *